United States Patent [19]

Newell et al.

[11] Patent Number: 4,716,344
[45] Date of Patent: Dec. 29, 1987

[54] MICROPROCESSOR CONTROLLED LIGHTING SYSTEM

[75] Inventors: Darrel E. Newell, Bayport; Mary C. O'Brien, Stillwater, both of Minn.

[73] Assignee: Micro Research, Inc., Bayport, Minn.

[21] Appl. No.: 841,790

[22] Filed: Mar. 20, 1986

[51] Int. Cl.⁴ .................... H05B 37/00; H05B 39/00; H05B 41/00

[52] U.S. Cl. .................................. 315/312; 315/294; 315/314; 315/316; 362/250; 362/418; 362/420

[58] Field of Search ............... 315/294, 295, 296, 292, 315/312–319; 362/242, 250, 418, 420, 227, 2, 3, 426, 802

[56] References Cited

U.S. PATENT DOCUMENTS

| | | | |
|---|---|---|---|
| 2,097,537 | 11/1937 | Snyder | 362/426 |
| 2,659,038 | 11/1953 | Heyer | 315/316 |
| 3,845,351 | 10/1974 | Ballmoos et al. | 362/253 |
| 4,095,139 | 6/1978 | Symonds et al. | 315/294 |
| 4,240,011 | 12/1980 | Dinges et al. | 315/294 |
| 4,423,469 | 12/1983 | Zerlaut et al. | 362/2 |
| 4,460,943 | 7/1984 | Callahan | 362/802 |

Primary Examiner—Saxfield Chatmon
Attorney, Agent, or Firm—Orrin M. Haugen; Thomas J. Nikolai; Frederick W. Niebuhr

[57] ABSTRACT

A system for directing a plurality of lighting instruments in accordance with an operator designed sequence. The system includes a control module and a plurality of satellite modules where each satellite module is, in turn, connected in a controlling relationship to a further plurality of drive motors which are mechanically connected to the light assemblies for directing the beams to move in accordance with a stored program of presets contained in the memory of a microprocessor in the control module.

8 Claims, 15 Drawing Figures

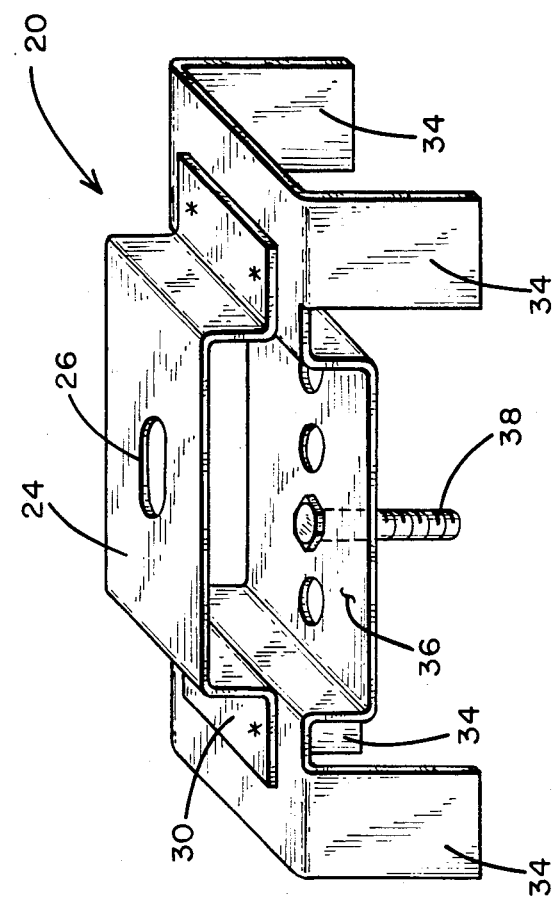
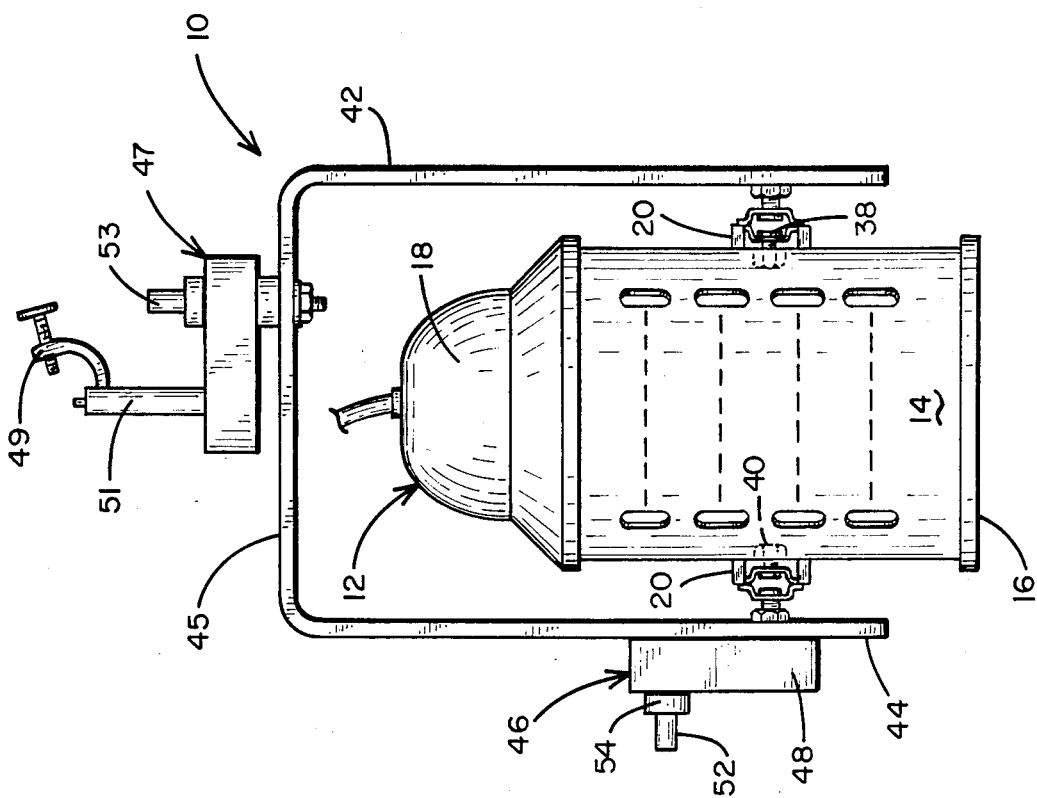
Fig. 2
Fig. 1

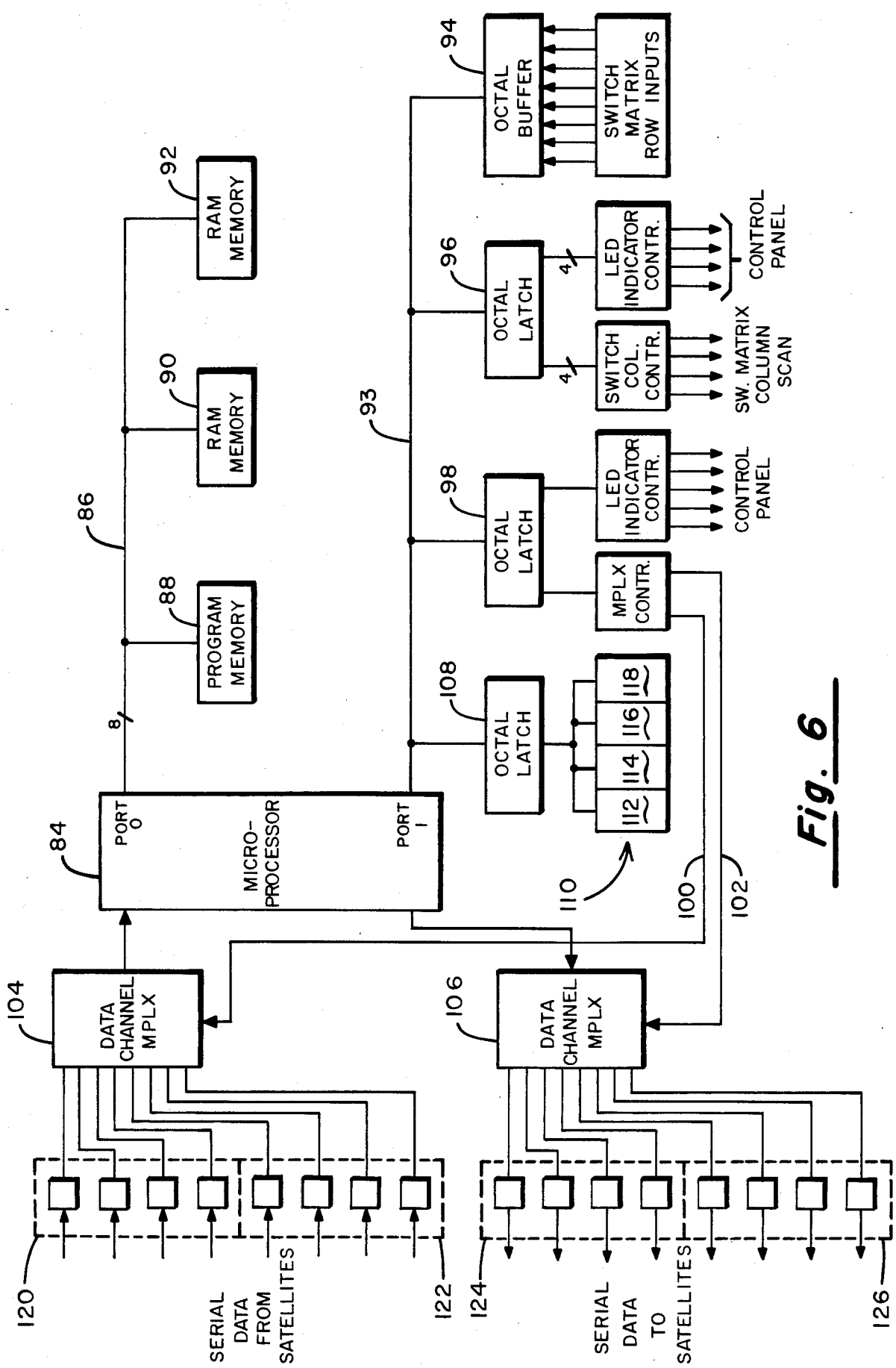

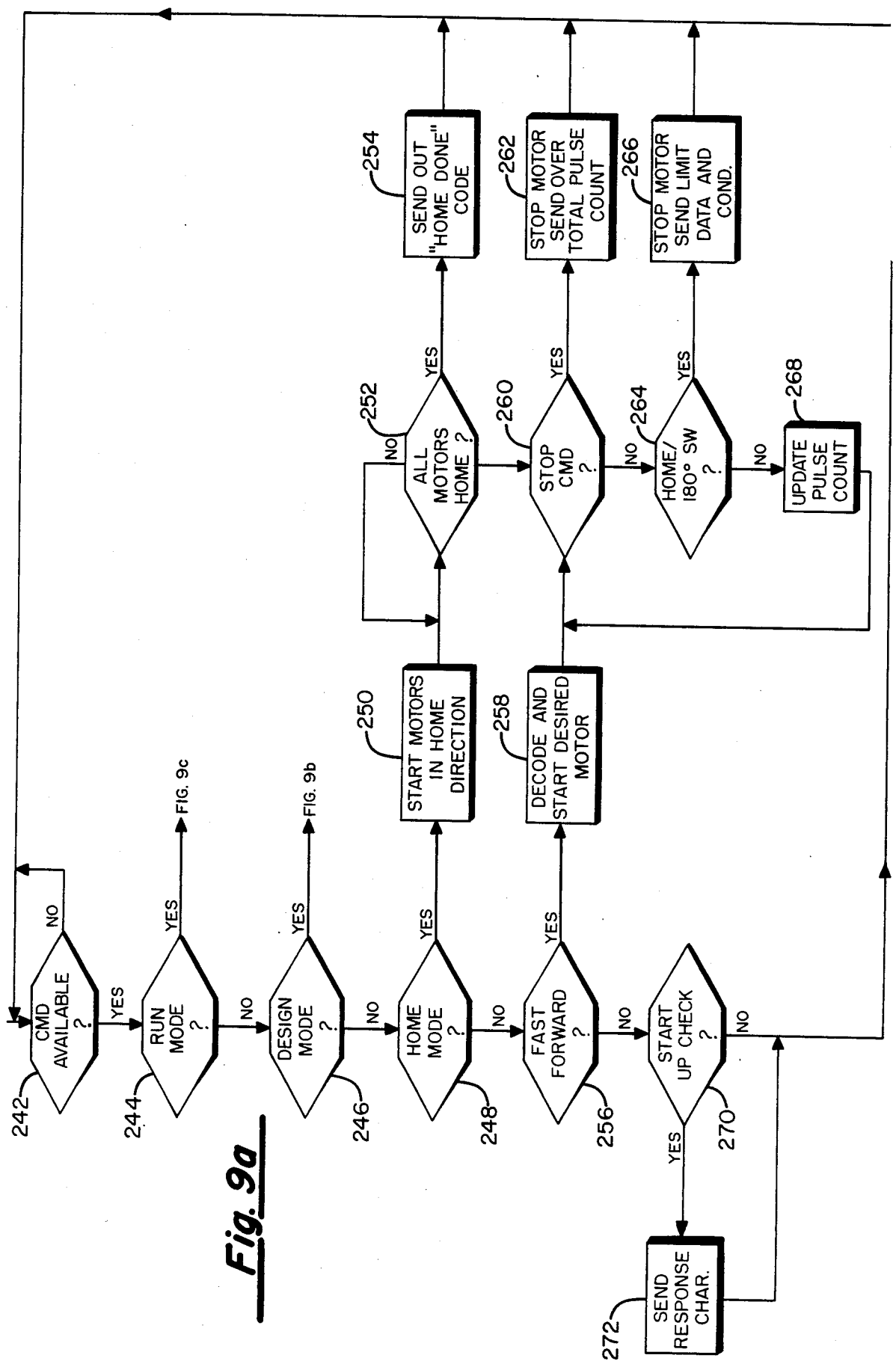

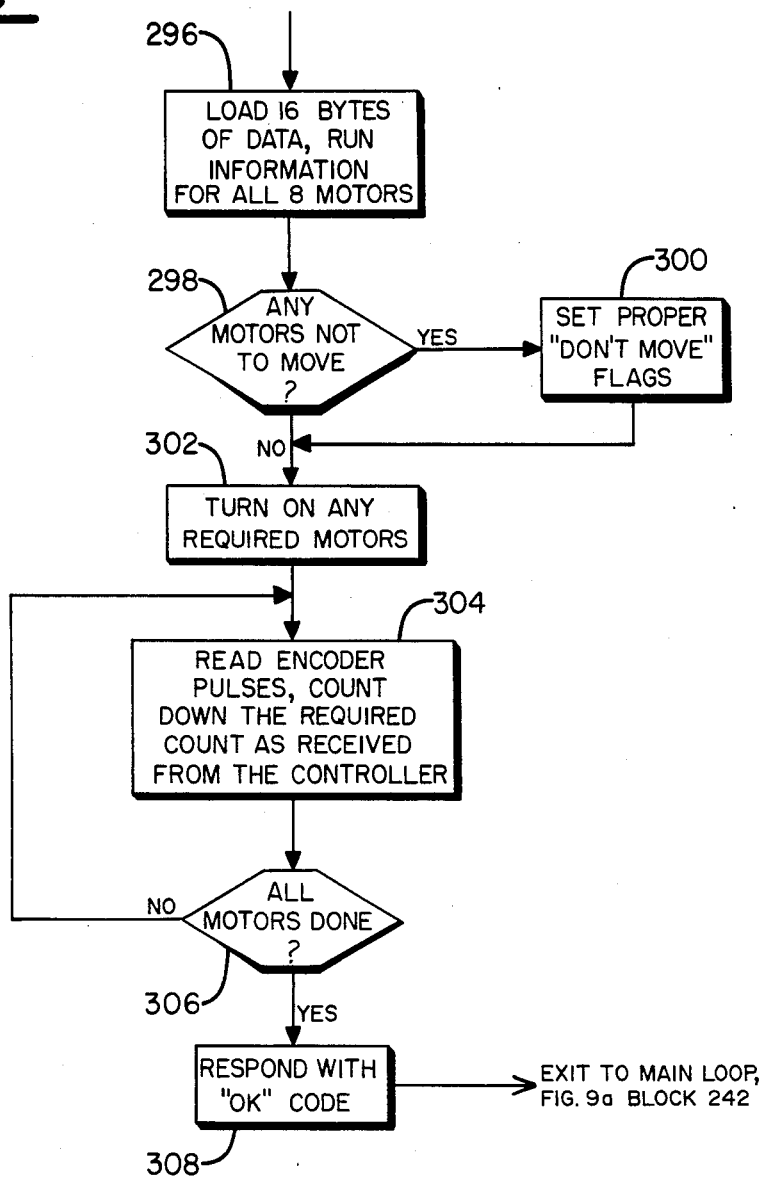

MICROPROCESSOR CONTROLLED LIGHTING SYSTEM

BACKGROUND OF THE INVENTION

I. Field of the Invention

This invention relates generally to lighting props for theatre and nightclub applications, and more specifically to an electronic, microprocessor-based control system for directing the beams from a plurality of individual lights in accordance with an operator designed sequence stored in the memory of the microprocessor.

II. Discussion of the Prior Art

In theatre, auditorium and nightclub settings, where the entertainers move about a stage, it is oftentimes desirable to be able to redirect the beams of individual lights so that different locations on the stage can be illuminated with the same lamps to create special lighting effects by continuous movement of light beams. For the most part, in the past, it has been up to members of the stage crew to manually direct the lights.

Efforts to automate the movement of lighting instruments, such as spot lights, flood lamps, etc., have involved driving these instruments using a motor-driven cam arrangement. Using such a cam drive, the lighting instruments may be made to repeatedly sweep in a given invariable pattern and sequence. This pattern and sequence can only be changed by replacing the cam elements themselves. This has required a redesign of the canisters used to hold the lamps so as to accommodate the drive. Thus, existing fixtures in the theatre or stage lighting had to be changed or replaced.

SUMMARY OF THE INVENTION

The foregoing drawbacks of the prior art light directing systems have been overcome by mounting the theatre's existing, standard light canisters in universal brackets or yokes and by providing first and second drive motors between the yoke and the canisters and between the yoke and a stationary support member for selectively rotating the canister through 180° in both a horizontal plane and a vertical plane.

The control system for the motors includes a main controller module and a plurality of satellite modules which are coupled together for bi-directional communication via serial data paths. Each satellite module is capable of being connected to the drive motors of a first plurality of lamp canisters while the controller module likewise communicates with a second plurality of satellite modules. For example, in the embodiment to be described herein, each satellite module may drive the two lamp drive motors of four lamp assemblies while the controller module can send and receive information between itself and up to eight satellite modules. Thus, 32 individual lighting instruments are capable of being directed.

Contained within the controller module is a microprocessor and associated PROM and RAM memories. Furthermore, the controller module has a keyboard allowing manual entry of information into the microprocessor's memory as well as suitable indicators and displays for interactive communication with a human operator.

Each of the satellite modules also includes a microprocessor coupled in controlling relationship to the individual motors associated with that satellite, and it also receives digital information from optical encoders coupled to the motor shafts so that positional information can be sent to the controller module for identifying the present location of the individual lamps. The microprocessor in the controller module then compares the present position information with a selected preset position and develops a serial data stream which is sent to the microprocessor in the satellite module to bring the lamps from a current position to a new desired position.

OBJECTS

It is accordingly a principal object of the present invention to provide an improved system for directing one or more lighting instruments in an entertainment setting.

Another object of the invention is to provide a lighting control system for a theatre, auditorium or nightclub stage in which the illuminating instruments can be repositioned in accordance with a preprogrammed plan and put into continuous motion for creating special effects.

Still another object of the invention is to provide a lighting control system which can readily be adapted to existing lighting instruments in a theatre or nightclub setting and which can significantly reduce the number of lights required as compared to instances where the lights are fixed in position.

Yet still another object of the invention is to provide a microprocessor-based control system for lighting instruments and the like in which one or more of a large plurality of such instruments may be focused along any radius of a hemisphere centered on the brackets supporting the lamp.

These and other objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE DRAWINGS

FIG. 1 is a side elevation showing a lamp assembly supported by a motor driven bracket;

FIG. 2 is a perspective view of the attachment device for coupling a conventional light canister to the bracket of FIG. 1;

FIG. 6 is a block diagram of the circuitry contained within the controller module of FIG. 4;

FIGS. 9a through 9c are flow diagrams of the software routines executable by the satellite module microprocessor.

DESCRIPTION OF THE PREFERRED EMBODIMENT

Figure 3:
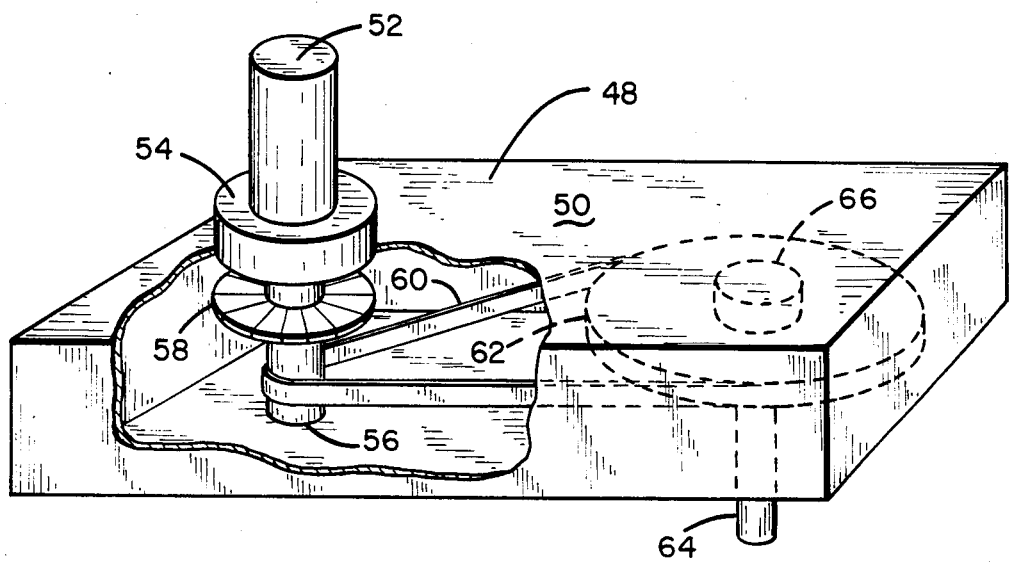
FIG. 3 is a perspective drawing of a motor drive module in accordance with the present invention.

Referring first to FIG. 1, there is indicated generally by numeral 10 the mechanical design of a motorized lamp directing device. The lamp itself is indicated by numeral 12 and is of a conventional design, including a generally cylindrical canister 14 having an open bottom end 16. Disposed within the canister is an electric lamp (not shown) which is screwed into a ceramic fitting contained within the dome-like end-cap 18.

In most applications, the lamp assembly 12 is suspended by bolts from a structural frame member. In adapting the commercially available lighting fixture 12 for use in the system of the present invention, the same bolts that are normally used for mounting the fixture to a frame are used to secure specially designed brackets 20 to the outer cylindrical surface of the canister 14.

An enlarged view of the bracket 20 is illustrated in FIG. 2 and is seen to comprise a generally U-shaped metal strap 24 having a non-circular (oval) aperture 26 disposed in the top surface thereof. The strap includes a pair of opposed flanges 28 and 30 which are spot welded to a support frame 32. The support frame has integrally formed, downwardly extending legs 34 at each corner thereof and spanning an opening formed in the plate 32 is a flex plate 36 having a bolt 38 passing through a central opening thereof.

Referring again to FIG. 1, it can be seen that the brackets 20 are secured to the canister by the bolt 38. In that the clinch nut 40 secured to the inner surface of the canister is normally disposed at a slight angle with respect to the perpendicular, by providing the flex plate 36, the bolt 38 can be aligned with the clinch nut 40. When the bolts 38 are tightened down, the legs 34 abut the cylindrical side surface of the canister 14 so that the member 20 is constrained from rotating.

With reference again to FIG. 1, the mounting assembly includes a U-shaped metal bracket 42 and attached to one leg thereof, e.g., leg 44 is a motor assembly. This motor assembly is illustrated more fully in the enlarged view of FIG. 3. It is seen to include a box-like enclosure 48 having four mutually perpendicular side walls extending downwardly from a top plate 50. The enclosure 48 is partially broken away to expose more clearly the working parts contained within the housing. A DC motor 52 and its gear box 54 is mounted on the top plate 50 and has a shaft 56 extending into the interior. Secured to the end of the motor shaft is an encoder wheel 58 having a pattern of sensable indicia inscribed thereon and capable of being sensed by a suitable pick-up device (not shown). Also cooperating with the shaft 56 is an endless belt 60 which is also entrained about a larger diameter pulley 62 secured to a driven shaft 64. Shaft 64 is journaled for rotation in a bushing 66 secured to the cover plate 50. In the preferred embodiment, the relative diameters of the drive shaft 56 and the pulley 62 are such that an 18:120 reduction results. This ratio gives a 1° movement to the light head for each impulse generated by the encoder wheel 58.

Referring to FIGS. 1 and 2, the end of the shaft 64 is shaped to fit within the non-circular opening 26 in the strap 24 and thus, as the motor 52 drives the shaft 56 through the gear box 54, the lamp assembly 12 can be made to tilt in a vertical frame from the position shown, essentially 90° in either direction in 1° increments.

A further motor assembly 47 is secured to the base-portion 45 of the U-shaped bracket 42 and, when the C-clamp 49 passing through a hole in the top of bracket 51 is tightened against a stationary support frame (not shown), the DC motor 53 will drive the U-shaped bracket 42 about a vertical axis when viewed in FIG. 1 to pan the light head in a horizontal plane. Thus, the motors 46 and 47 associated with each of the lamp assemblies 10, when appropriately powered, can cause the beam emanating from the canister 14 to scan 180° in both a vertical and horizontal plane.

Having described the mechanical features of the lamp assembly itself, attention will next be given to the electronic control system used to drive the tilt and pan motors 52 and 53, respectively.

Figure 5:
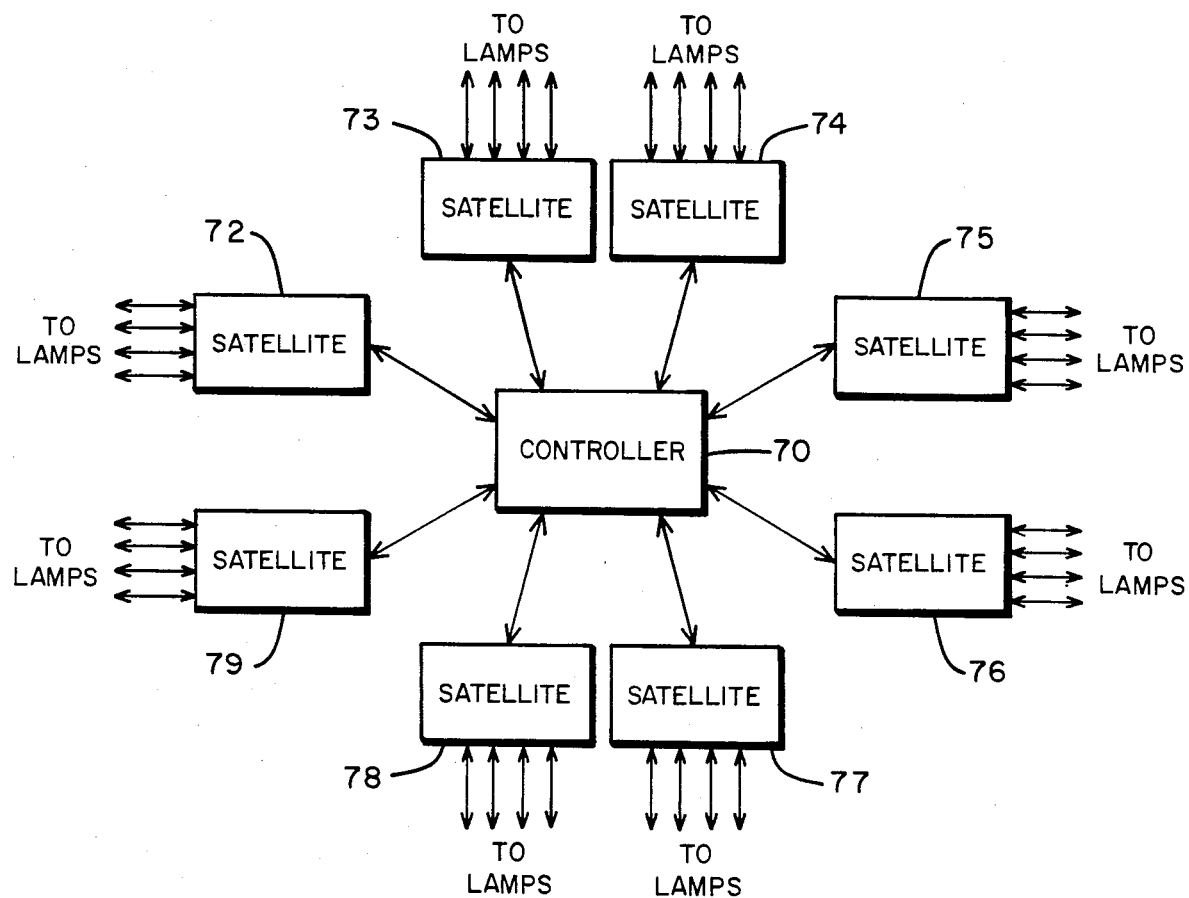
FIG. 5 is a general block diagram of a preferred embodiment of the lamp control system of the present invention.

Referring to the general block diagram of FIG. 5, the system is seen to include one controller module 70 which is coupled for bidirectional communication with a plurality of satellite modules 72 through 79, respectively. Each of the aforementioned satellite modules is able to control a plurality of lamp assemblies. While the system of FIG. 5 is shown as including eight satellites, each controlling four lamp assemblies, it is to be understood that the present invention is not to be limited to this particular configuration, but greater or lesser numbers of satellites and/or lamp assemblies may be included.

Figure 4:
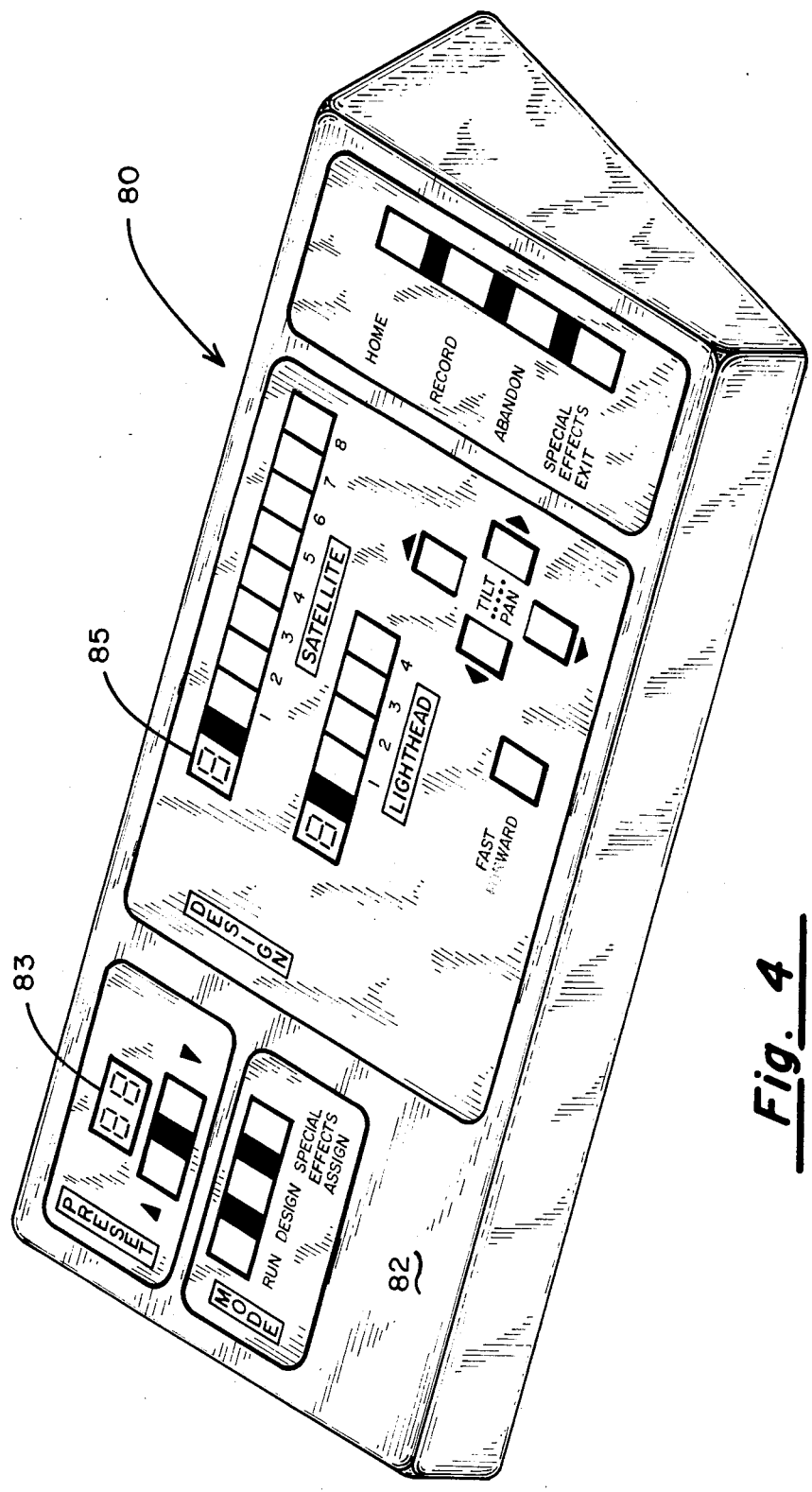
FIG. 4 is a perspective drawing of the control console of the controller module.

Having described the general system arrangement, consideration will next be given to the implementation of the controller module. In this regard, reference is now made to the perspective drawing of FIG. 4 which shows the control console of the controller module. It is seen to include a housing 80 for containing such things as a power supply and one or more printed circuit boards (not shown) on which the electronic components for implementing the controller are arranged and interconnected. The exposed panel 82 of the controller module 80 includes a plurality of switches and seven segment LED display devices. The panel 82 is broken down into a series of fields labeled "PRESET", "MODE" and "DESIGN". The up/down keys of the PRESET field allow the operator to select any preset member from 1 to 96 and the number will be displayed in the window 83. Similarly, any one of the eight satellites can be selected for communication by depressing one of the switches labeled "SATELLITE" and the number of the one selected will be displayed in the window 85. The same holds true for selecting one of the four light heads associated with a selected satellite. The purpose of "HOME", "RECORD", "ABANDON" and "SPECIAL EFFECTS EXIT" keys will become apparent as this description of the preferred embodiment continues.

FIG. 6 illustrates by means of a block diagram the implementation of the controller electronics contained within the housing 80. The controller is seen to include a microprocessor 84 which, in the preferred embodiment, may comprise an Intel 8031 which is a single chip microcomputer. Those skilled in the art wishing to know more about the architecture, programming and applications of the Intel 8031 microcomputer are referred to Intel Corporation publication entitled *MCS-51 Family of Single Chip Microcomputers User's Manual* published in 1981. This chip has four bi-directional ports. Coupled to port 0 is an 8-bit bus 86 to which a program memory 88 and operand memories 90 and 92 are connected. The program memory 88 is preferably a PROM capable of storing 8K 8-bit words. Similarly, the RAM memories 90 and 92 may each provide storage for 8K 8-bit words and includes a battery back-up for maintaining the memory contents in the event of a power failure.

Port 1 of the microprocessor 84 has a number of input and output devices coupled thereto. Specifically, the 8-bit lines associated with port 1 are coupled through an octal buffer chip which may be a Type 74C244 integrated circuit which receives at its inputs the output from eight rows of a switch matrix used for selecting a particular one of the eight satellites.

Also associated with port 1 are three octal latch chips which, in the preferred embodiment, the Type 74C373 integrated circuits. Information latched in the chip 96 performs two functions. Four of the eight outputs are used to scan the switch matrix to determine which of the four columns is to be read from. The remaining 4-bits of the octal latch 96 are used to drive LED indicators on the control panel.

Those skilled in the art will recognize that with a switch matrix having eight rows and four columns, there results thirty-two possible switch points. The octal latch 98 provides up to six lines for driving control panel indicators. In addition, the bits appearing on output lines 100 and 102 are, respectively, connected to data channel multiplexers 104 and 106 for determining whether serial data will be received by the microprocessor as an input or whether serial data will be provided as an output and on which of the eight channels. The data channel multiplexer chips 104 and 106 may each comprise CD4051B integrated circuits.

Also coupled to the Port 1 bus 93 is a further octal latch circuit 108 whose outputs are used to drive a seven segment LED display device 110. Display positions 112 and 114 are used to present the preset number and can range from 0 to 99. Display position 116 is used to indicate the channel or satellite number while display position 118 is used to indicate the particular lamp associated with the selected satellite module.

Data from the satellites enters the controller module via two-wire differentially driven lines and are applied through line receiver chips 120 and 122 to the inputs of the data channel multiplexer 104. The line receiver chips, in the preferred embodiment, typically comprise Motorola Type MC3486 quad devices. Likewise, data from the microprocessor 84 to be sent to the satellites is routed over the appropriate channel, via data channel multiplexer 106 and the quad line driver chips 124 and 126. Here, the line drivers may comprise Motorola Type 3487 integrated circuit chips. The data supplied to the satellites is in serial form and is indicative of the current lamp position. Any change in position is monitored by the encoders coupled to the shafts of the lamp drive motors and the bracket drive motors and from microswitch limit sensing devices associated with the light heads. The data fed from the microprocessor 84, via the multiplexer 106, to the selected satellite is also fed over serial transmission lines by way of the line driver chips 124 and 126. This data generally comprises information relating to a desired position for a particular lamp or lamps controlled by the selected satellite module.

Figure 7:
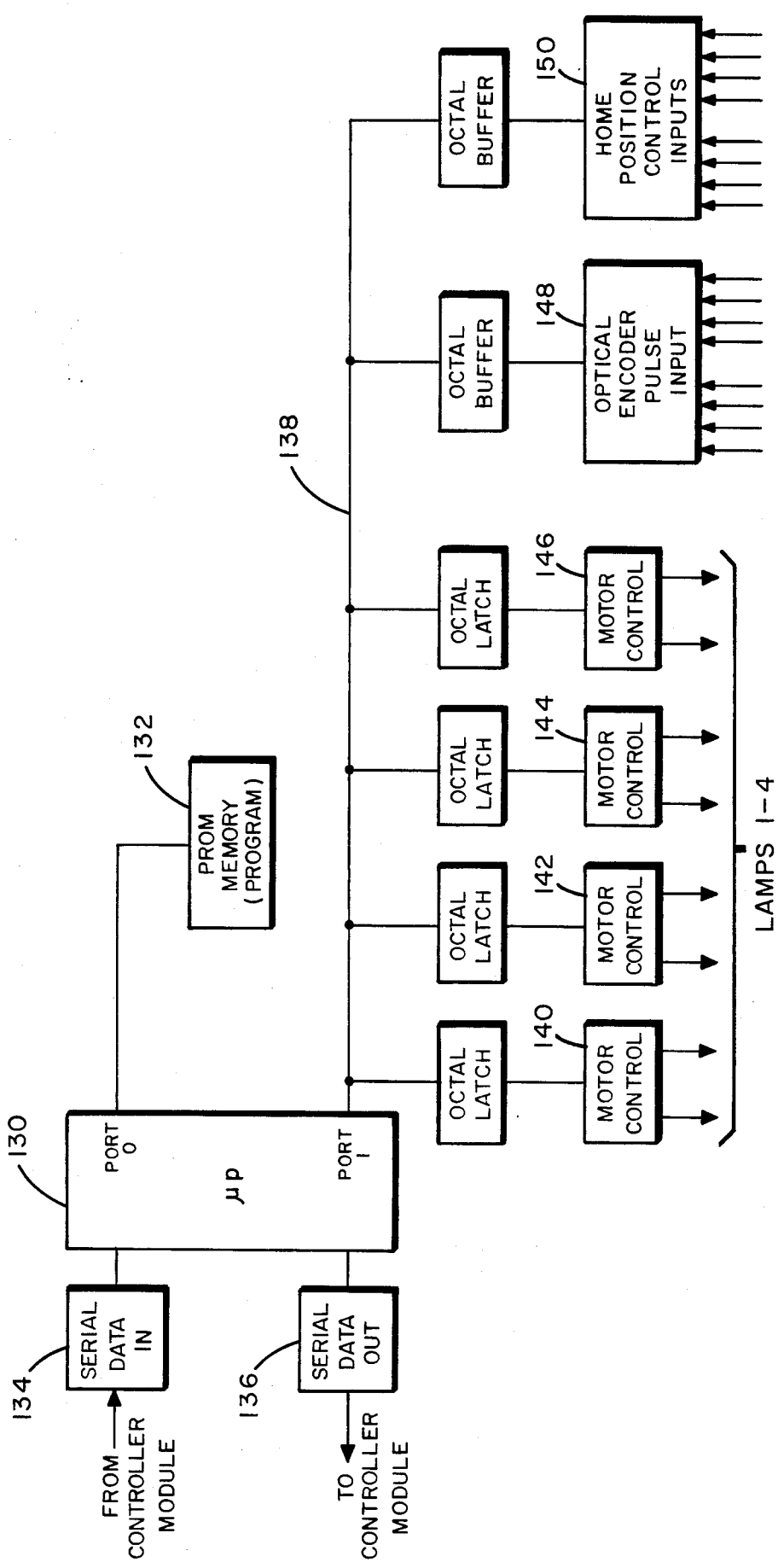
FIG. 7 is a block diagram of the satellite module used in the system of the present invention.

Referring now to FIG. 7, the constructional features of the satellite module will next be explained. As is illustrated, the satellite module also incorporates a microprocessor 130 which may also be an Intel 8031. In this application, it requires only a single program memory, here shown as a PROM device 132. In that the microprocessor 30 has sufficient random access memory on-board, there is no feed for an external RAM memory.

Serial data arriving from the controller to a given one of the satellites is converted from a balanced 422 type signal to a single line, serial TTL level by the device 134 which, in the preferred embodiment may comprise a Type UA9637 integrated circuit. Similarly, data to be fed from the microprocessor 130 to the controller module is fed through device 136 which converts from a TTL level to a balanced 422 signal on a twisted pair transmission line.

Coupled to the input/output port 1 of the microprocessor 130 is a 8-bit bus 138 and coupled to this bus are a set of motor control chips 140–146. For the twelve volt DC motors 52 and 53 used for positioning the lamps, it has been found that a Sprague-type UCN 2993 dual H-bridge motor driver circuit is readily suited to this application. In this chip, each of the pair of full-bridge drivers has separate input level shifting, internal logic, source and sink drivers in an H-bridge configuration and internal clamp diodes. Using the H-bridge, a binary high and low digital signal applied to the "phase" input will cause the motor to rotate in one or the other direction, provided an enable signal is simultaneously applied. If the enable signal is low, the motor will be off, irrespective of the binary state of the "phase" input.

Also coupled to the bus 138 are two input ports 148 and 150. Port 148 captioned Optical Encoder Pulse Input receives optical encoder pulses from the two optical encoders associated with each of the four lamp/bracket assemblies coupled to a given satellite module. The "home" position control inputs 150 come from microswitches associated with the lamp assembly 12 and the motor driven bracket 42. When the light head 10 reaches a predetermined position in its travel arbitrarily defined as "home", a microswitch associated with each of the motors on a given head is closed and it functions to direct that the motors be stopped. Similar microswitch devices are located at the 180° limit position. At this point, certain internal registers in the microprocessor are reset, thus providing a starting position from which subsequent lamp assembly movements can be referenced.

Now that the constructional features of the lamp-head, the controller module and the satellite modules have been explained, consideration will next be given to the operation of the automatic lamp focusing system of the present invention.

OPERATION

The controller provides three basic modes of operation. The first, called the "Design" mode allows a lighting director to select a present number defining a lamp arrangement he wishes to present. He then enters the "Design" mode by selecting an appropriate switch on the controller module keyboard and then proceeds to move the lights to the selected positions using the "Tilt" and "Pan" switches. These positions can then be stored in the RAM memories 90 and 92 for later reference. These memories allow the storage of up to 90 preset positions for a total of 32 lamp assemblies. In addition to the 90 standard presets, six further presets are capable of being stored for use in a "Special Effects" mode. In this latter mode, the designer can assign up to six different preset positions to one "Special Effect" queue and, when this mode is in operation, one or more lamps may follow a predetermined path defined by the selected preset positions in one continuous movement.

A third mode of operation is referred to as the "Run" mode. Here, a preset number may be selected and when the "Run" button on the console is depressed, the lamps will move to the positions called for in the selected preset. When a "Special Effects" preset queue number is selected and the "Run" button is depressed, the lights will begin moving from position-to-position in a continuous movement until halted by the actuation of the "Special Effects Exit" key on the console 80.

Using the system of the present invention, the lighting director, during a rehearsal of an entertainment session, can create a desired program of lamp movements by entering the "Design" mode. Here, the design switch on the console 80 is depressed and a LED will light up to indicate that the system is in the "Design" mode. Next, the designer may move one or more of the plurality of lamps individually, 1° at a time, into a desired position using the "Tilt/Pan" switches on the keyboard on the controller module. If the "Fast Forward" option is selected, the lamp or lamps will move in the Tilt/Pan direction continuously until the light is at its 180° limit. After all light positions are designed in the foregoing fashion, the director, by pressing the "Record" switch on the keyboard twice, causes all position data in the memory to be saved as the preset number currently displayed. On the other hand, if the director does not wish to save any of the tilt/pan moves just performed, a double depression of the "Abandon" switch causes the system to exit the design mode while preserving any previously stored presets in the same condition they were prior to selecting the "Design" mode.

Figure 8A:
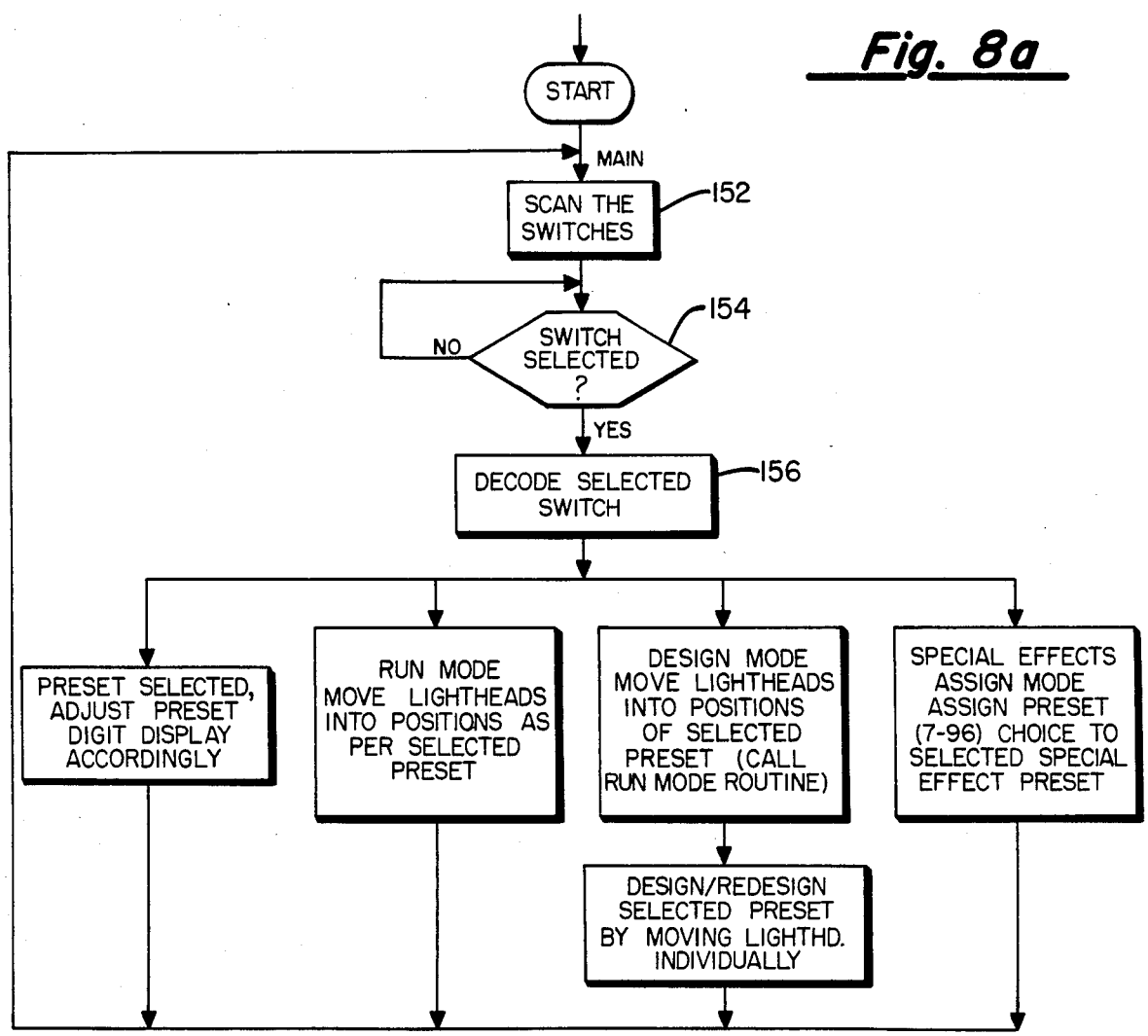
FIGS. 8a through 8e are flow diagrams of the software routines executable by the controller module microprocessor.

Referring next to FIG. 8(a), there is shown a flow chart of the main routines stored in the program memory 88 of the controller module (FIG. 6). When in this main routine, the processor 84 continually scans the switch matrix associated with the various push buttons on the control console to determine if any change has been made in the status of any of the various switches since a previous scan (blocks 152 and 154). If so, the particular selected switch is decoded (block 156) to determine whether a preset has been selected or whether a given one of the three possible mode switches (Run, Design, or Special Effects Assign) has been selected.

Figure 8E:
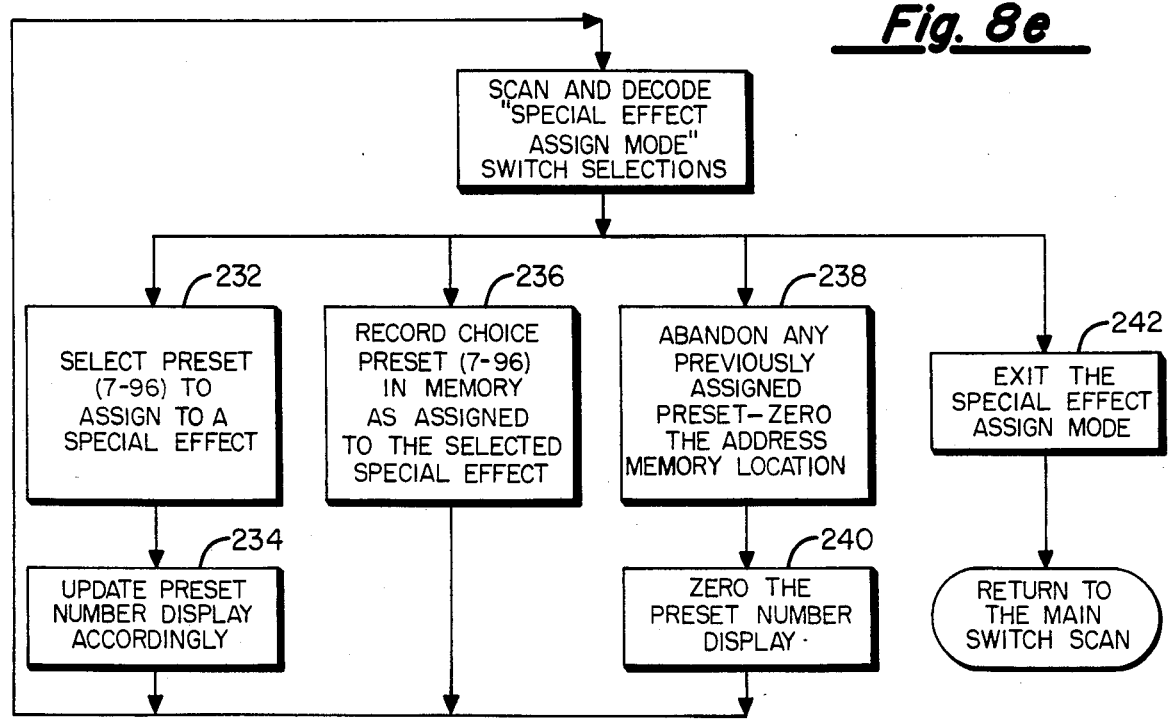
Figure 8B:
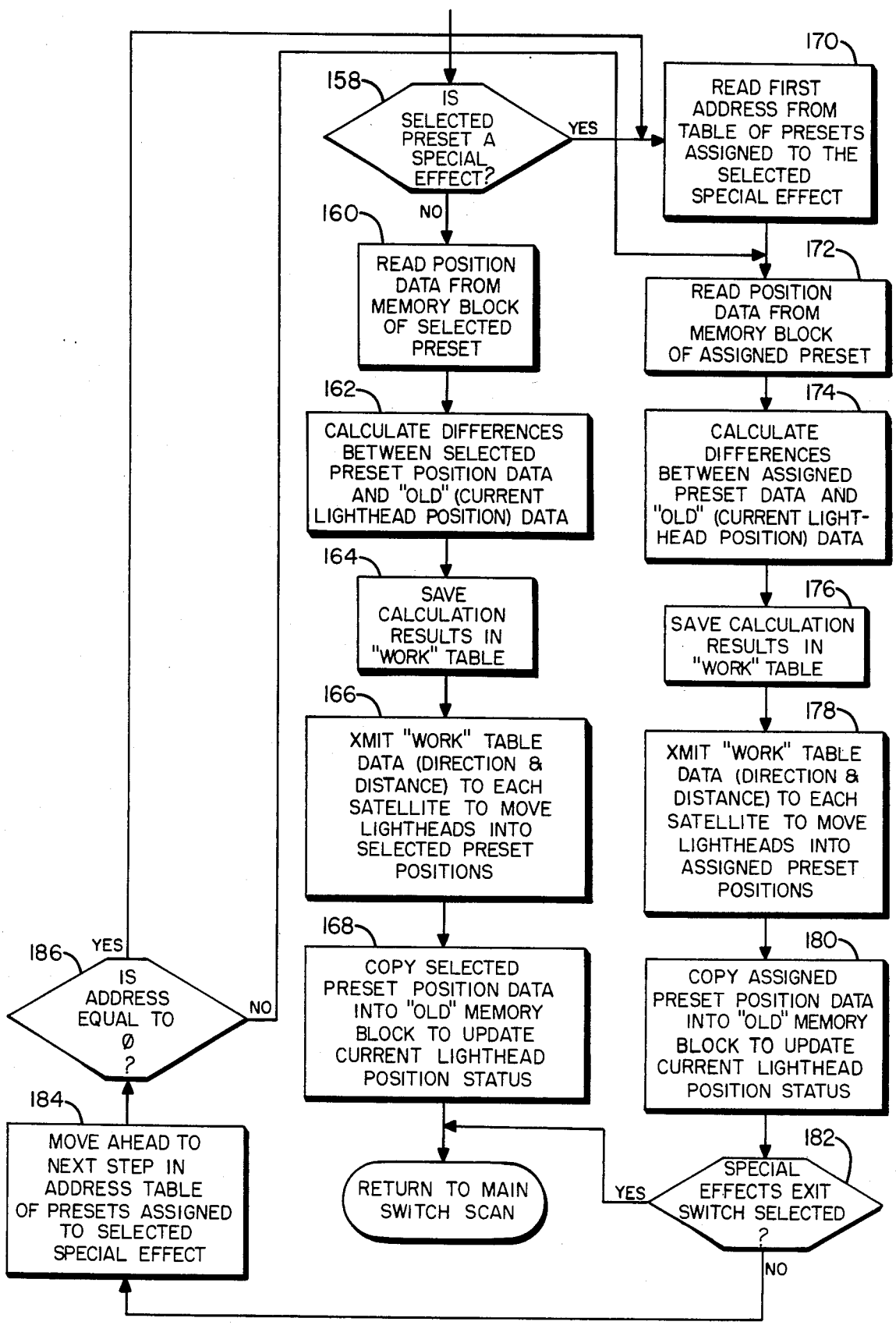

The flow chart of FIG. 8(b) describes the program sequence when the controller is in its "Run" mode. As is illustrated, a test is first made to determine whether a selected preset is a "special effect" (block 158). If not, the position data of the selected preset is read from the RAM memory 90 or 92 into the microprocessor 84 (block 160) and a calculation is made to determine the difference between the selected preset position data and the "old" data representing the current light head position (block 162). The results of the calculation are saved in a work table also contained within the RAM memory 90 or 92 (block 164). Next, the "work table" data, including distance and direction, is transmitted from the controller module to a designated satellite by way of the data channel multiplexer 106 and the appropriate channel so selected so that the light heads will be moved into their selected preset positions (block 166). Once that preset position has been reached, its position data is stored back into the "old" memory block, thereby updating the current lighthead position status (block 168). This completes the "Run" mode subroutine when the selected preset is not a "Special Effect". Hence, a return is made to the main switch scan (block 152) in the flow chart of FIG. 8(a).

If, however, the selected preset had been a "Special Effect", the first address is read from a table of presets which had been assigned to the selected special effect (block 170).

Next, position data is read from a memory block of assigned presets into the microprocessor (block 172) where the difference between the assigned preset data and the "old" data which is indicative of the current lighthead position is calculated (block 174). As indicated by block 176, the results of the calculation are stored in a worktable. Next, the workable data (direction and distance) are transmitted to each satellite module. This ultimately causes the lightheads to be moved to their assigned preset positions (block 178). So that the microprocessor will know where the particular lightheads have been repositioned, the assigned position data is copied into the "old" memory block, thus replacing the current contents indicative of the old location (block 180).

Following that, a test (block 182) is made to determine if the "Special Effects Exit" switch on the console had been selected. If so, the microprocessor exits the "special effects" mode and returns to the main switch scan (block 152). If, however, the "Exit" switch had not been depressed, the next address in the table of presets assigned to the selected special effect is accessed (block 184). Then, this address is tested to determine if it is equal to zero (block 186) and, if so, the sequence is repeated by again reading the first address from the table of presets (block 170). On the other hand, if the address of the next preset assigned to the selected special effect had not yet been decremented to zero, the position data relative to that address is read from the block of memory assigned for storing presets (block 172). Thus, until the exit switch is depressed, the lamps will all move in accordance with the special effects sequence of presets selected.

Figure 8C:
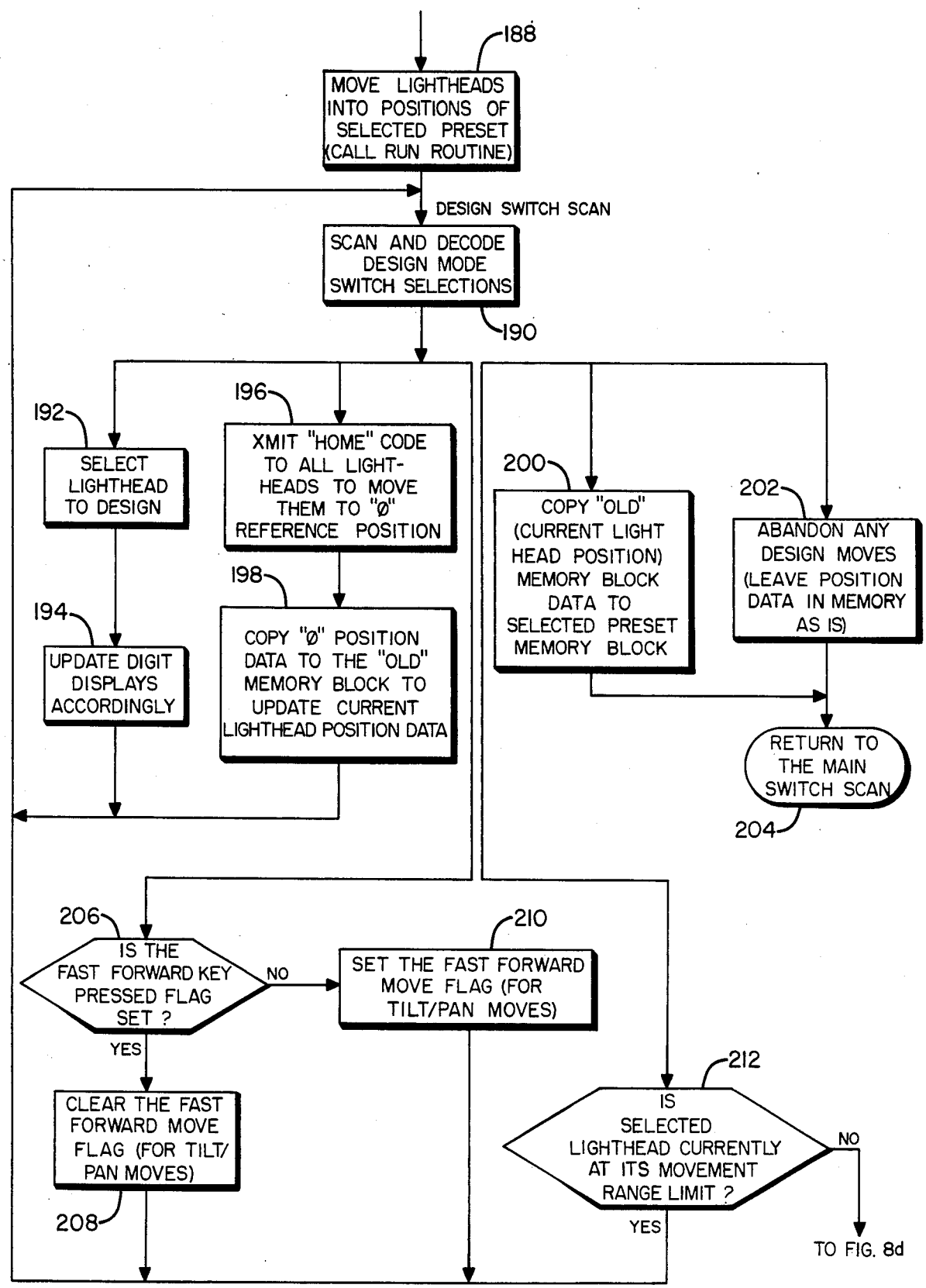
Figure 8D:
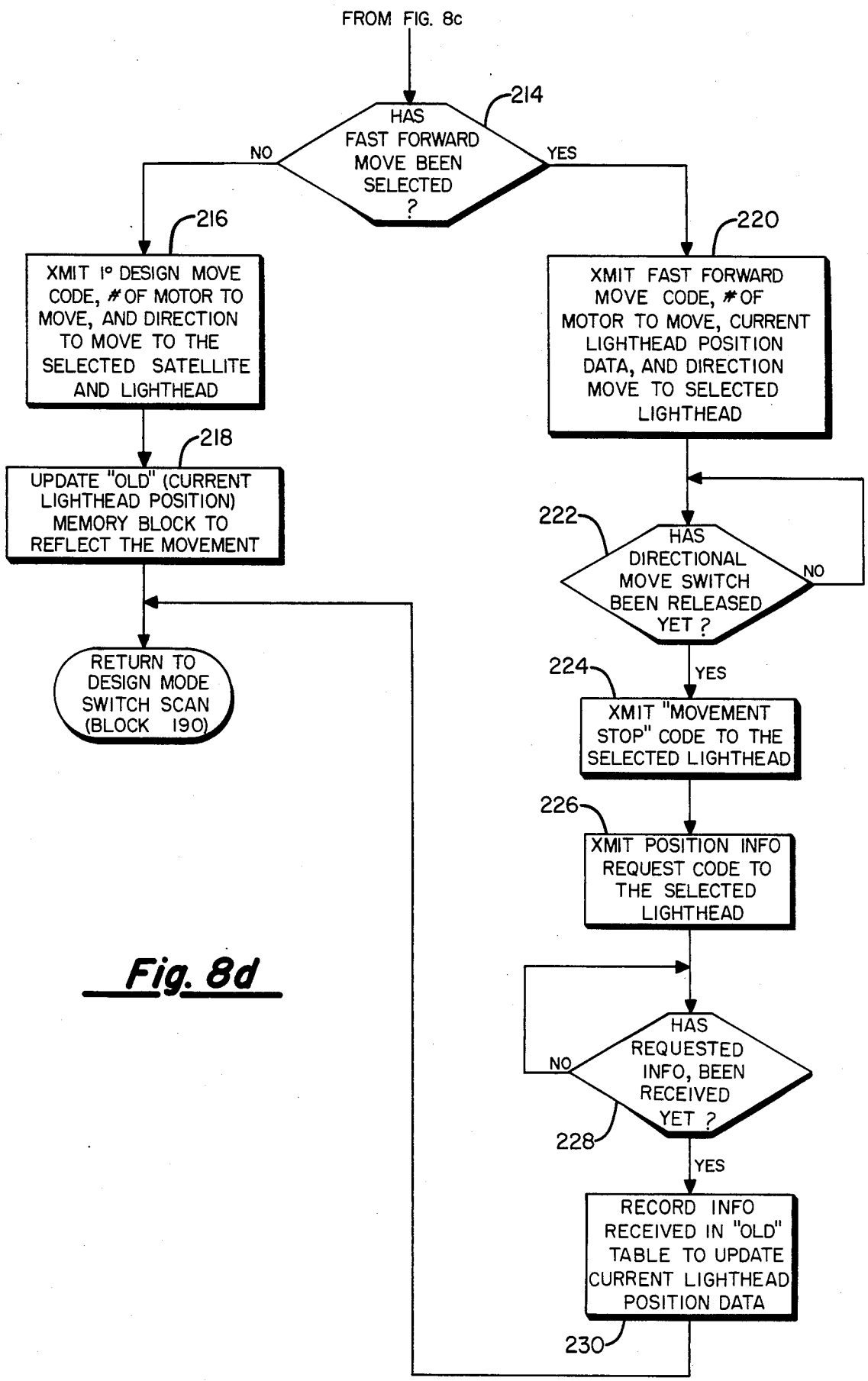

The Design mode routine is illustrated by the flow diagram of FIGS. 8(c) and 8(d). It is the operation in this mode that allows the director to create a programmed sequence of presets which will later be executed whenever the "Run" mode switch is actuated. As represented by block 188, the controller module, by calling the Run routine, first moves the light heads into the positions of the already selected preset. Thus, when beginning the Design mode, the light heads are all at a known, predetermined position, i.e., at the locations specified in the "old" memory table. The microprocessor then continually scans the keyboard to determine if any of the Design mode switches (FIG. 3) have been actuated. This is represented by block 190 in FIG. 8(c).

A particular light head to be designed is identified by first selecting the particular satellite number (1-8) to which that light head is associated and then by identifying the lighthead number (1-4) (block 192). The microprocessor then up-dates the digit displays (block 194) so that the appropriate satellite number and light head is presented on the controller display panel.

If the "Home" key had been depressed, the controller transmits the "home" code to all lightheads to cause them to be moved to their zero reference position (block 196). Following that, the zero position data is stored away in the "old" memory block to up-date the current lighthead position data (block 198).

After all of the lights have been moved to a desired preset position, those preset positions can be stored in a preset memory block by depressing the "Record" switch. That results in the contents of the "old" memory block being transferred into the preset memory block where it is held until the light head configuration is again re-designed. These operations are represented by block 200 in FIG. 8(c). If before pressing the "Record" button the director wishes to dispense with the lamp positions he has just configured during a design mode operation, he may do so by depressing the "Abandon" switch which leaves the position data as it was in the "preset memory block (block 202). Irrespective of whether the "Record" or the "Abandon" switch is depressed, control returns to the main switch scan sequence (block 204).

Still with reference to the Design mode flow chart of FIG. 8(c). If the scan of the Design mode switches reveals that the "fast forward" key has been depressed, a test is made to determine whether a flag associated with that key has already been set (block 206) and, if so, the flag is cleared (block 208) and control returns to the scan of the switch matrix. If the fast forward key flag had not been set (block 206), then this flag is set (block 210) before returning to the scan operation (block 190).

A test is also made as to whether the key-selected light head is currently at the limit of its range movement (block 212) and, if so, control again reverts to the switch scan operation. If the light head is not currently at the limit of its movement range a test is made as to whether the fast forward move has been selected (block 214) (FIG. 8(d)). If not, the controller module will transmit a 1° move code to the selected satellite and light head, the number of the motor to move, the direction in which the motor is to be moved and the current position data (block 216). The current light head position, as stored in the "old" memory block, is up-dated to reflect the 1° movement (block 218) before control returns to block 190, the Design mode switch scan sequence.

If the Fast Forward Move mode had been selected (block 214), the controller transmits the "fast forward move" code, the number of the motor to be moved, the current light head position data and the desired direction to move the selected light head (block 220). Next, a test is made to determine whether the "tilt/pan" directional move switch has been released (block 222) and, if so, a "Movement Stop" code is transmitted to the selected light head (block 224). Next, the Position Information Request code is transmitted from the controller module to the selected satellite and light head so that the light head in question can send back to the controller module a count corresponding to its current position (block 226). The controller module then waits for the requested information to be received (block 228) and when it is, it is stored in the "old" table to up-date the current light head position data (block 230) with control returning to the input to block 190 in the flow diagram (FIG. 8(c)).

The routine referred to as the "Special Effects Assign" mode is set out in the block diagram of FIG. 8(e). Here, the main routine (FIG. 8(a)) scans the manually-operable switches on the keyboard and when it detects that the mode switch referred to as "Special Effects Assign" has been depressed, the operator can select any preset in the range of from number 7 to number 96 to assign to a Special Effect (block 232). The microprocessor then updates the number displayed in the 7-segment LED windows accordingly to reflect the selected preset number (block 234). By next depressing the "Record" button, the preset is stored in memory in the Special Effect queue (block 236). If, by any chance, the director changes his mind as to whether he wants that selected preset, rather than hitting the "Record" key, he may choose the "Abandon" key which automatically causes the new setting to be disregarded and causes the displays associated with the preset to present zero digits (blocks 238 and 240).

When the director has completed his assignments as far as which of the six presets are to be included in the "Special Effects" queue, by hitting the "Special Effects Exit" key, control returns to the main switch scan (block 152) (FIG. 8(a)).

Figure 9B:
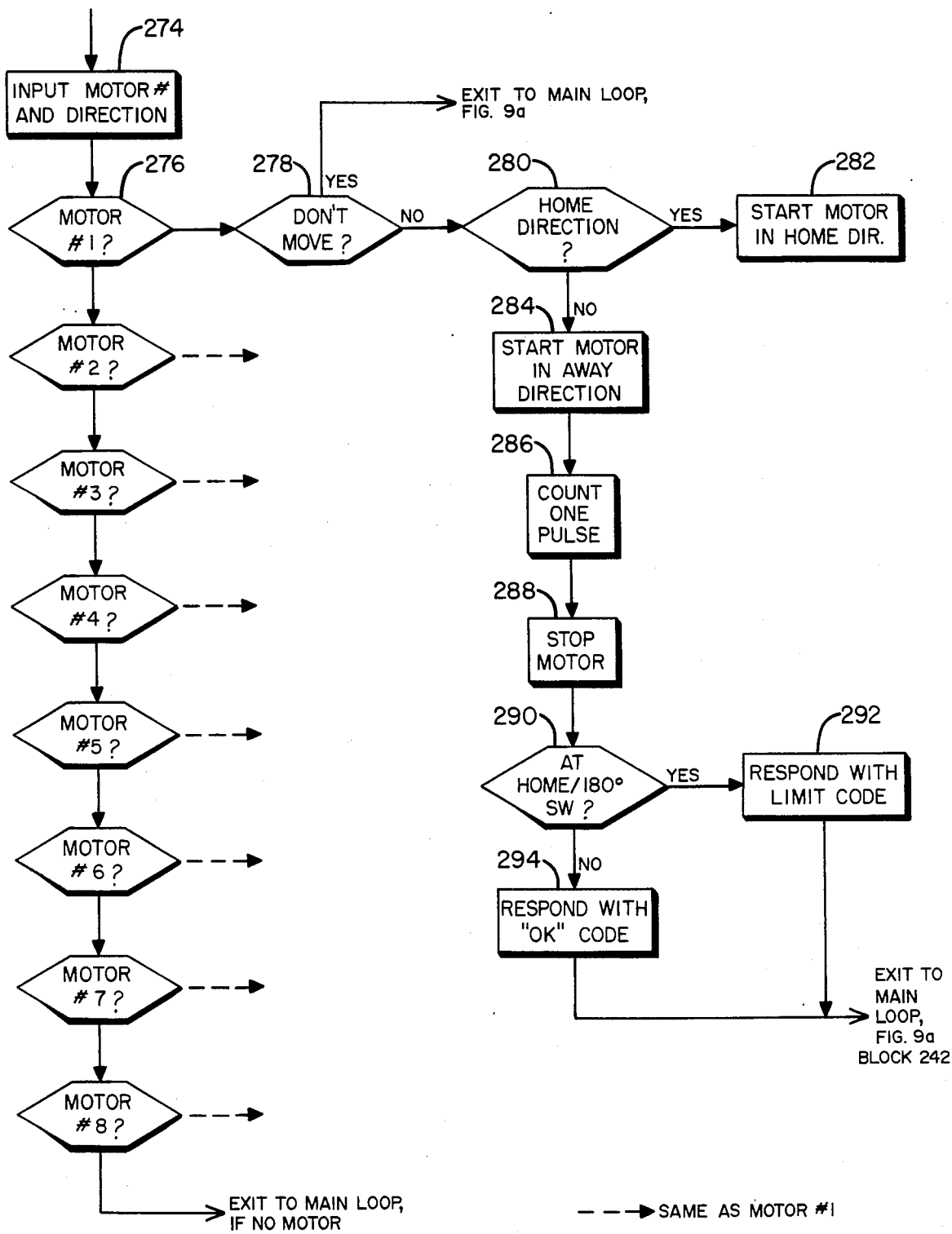

Having described the software organization for the microprocessor contained within the controller module 70, consideration will next be given to the software stored in the memory associated with the microprocessor contained within the satellite modules 72 through 79. Referring to FIG. 9(a), the microprocessor in the satellite is continually watching the serial data input line 134 (FIG. 7) to sense the presence of a command (block 242). It then determines which command is present and enters the routine depicted in the flow charts of FIGS. 9(b) or 9(c). Assuming that it is neither the code number for the "Run" mode as determined by decision block 244 nor the "Design" mode as determined by block 246, but instead, is the "Home" mode code number as sensed at block 248, it starts all of the motors associated with the particular satellite in question in the home direction (block 250) and then continually tests, as indicated by block 252, whether the "home" position has been reached. When it is, a "Home Done" code is sent from the satellite in question to the controller module to advise it that all motors associated with that satellite have been homed (block 254). Following the sending of the "Home Done" code, the satellite assumes its input line examining condition.

When a "Fast Forward" command appears on the input line to the satellite, associated with it will be a light number identifying the particular one of the four motors involved and that motor will be started (block 258). Following that, the microprocessor in the satellite watches for a Stop command from the controller module (block 260), and if one occurs, the selected motor is stopped and a pulse count from the applicable shaft encoder will be transmitted to the controller to advise it of the current position of the motor being driven (block 262).

If no Stop command had been sensed, but instead, either the Home or the 180° limit switch had closed, the motor in question would again be stopped and the satellite would transmit to the controller module an indication as to whether the lamp head was at its 0° or 180° end point (block 266).

If neither the Stop command nor the Home/180° switch had been actuated (blocks 260 and 264), the pulse count for the motor in question would be updated (block 268) and control then returns to the point where the sequence began, i.e., at the input of the decision block 260.

The flow chart of FIG. 9(a) also can sense whether the controller module is transmitting a "Start-up Check" command to a satellite. The presence of such command is detected at block 270 and, if at the initial set-up, the controller module had set a flag that no motors were to be activated by a given satellite, that satellite would send a response character to the controller to advise it of that fact (block 272). This feature is used primarily at system start-up so that a satellite can advise the controller whether or not it is in communication with it and whether it is necessary for the controller to "talk to" any ones of the satellites.

With reference to the flow diagram of FIG. 9(b), if the command sent from the controller module to the satellite module had indicated that the controller was in the "Design" mode, the decision at block 246 would route control to the routine depicted in FIG. 9(b). As indicated by block 274, the satellite in question waits to receive a byte of data indicating the particular motor number and direction it is to be rotated from the controller module. Irrespective of which of the motors 1 through 8 of a particular satellite module is received, the program flow is as indicated by the flow diagram associated with decision block 276. It is decision block 276 that determines whether the entered motor number is, in fact, motor no. 1. The first event to occur is that a test is made to determine whether motor no. 1 is already at its limit of movement and is, therefore, not to be moved in the particular direction specified. This is the function of decision block 278. If the motor in question is already at its limit extreme and cannot be moved further in the direction specified, control exits to the main loop on FIG. 9(a), i.e., that entering the decision block 242.

If the identified motor is not at its extreme position, a test is made to determine whether it is being commanded to move toward its "home" direction (block 280). If the command is to move in the "home" direction, that motor is started and rotates in the "home" direction (block 282). If the motor is not to move in its "home" direction, the motor is started and is made to rotate in the "away" direction (block 284). A shaft encoder pulse is inputed to an up/down counter to cause that counter to increment if the direction byte is indicative of a move toward the 180° or "away" direction and to decrement the tally if it is in the "home" direction. Following one such pulse, the motor stops (block 288) and a test is made (block 290) to determine if the motor is at its "home" or 180° switch position. If it is, the satellite sends a "Limit" code to the controller to advise it where the motor position is at (block 292). If the motor is at neither the "home" nor the "180° switch" position when tested at block 290, an "OK" code is transmitted to the controller module and control again exits to the main loop in FIG. 9(a) at the input to decision block 242.

Referring next to FIG. 9(c), the sequence of operations performed by the satellite microprocessor or will be explained with the assumption that the controller in its "Run" mode. In the "Run" mode, the satellite receives 16 bytes of data from the controller module which corresponds to two bytes of data per motor. The two bytes determine the direction and distance each motor is to be moved. This data comes in as a continuous data stream and once received (block 296), a test is made to determine if any of the motors are not to move because they are already at their appropriate position (block 298). If so, the appropriate "don't move" flags are set (block 300). If, however, one or the more of the motors is to be moved, that motor is turned on (block 302) and encoder pulses associated with those motors being driven are accumulated and used to decrement the distance byte so that when the value is decremented to zero, it is known that the motor has moved the requisite distance (block 304). At decision block 306, a test is made to determine if all of the motors have completed their motion in the fashion commanded and, if so, the "OK" code is sent to the controller advising it that the satellite in question stands ready to receive more data. Following the transmission of the "OK" code, control exits to the main loop shown at the entry to decision block 242 on FIG. 9(a).

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. A system for controlling the positioning of a plurality of lighting instruments, comprising:
   (a) yoke means for individually suspending each of said lighting instruments from a stationary frame;
   (b) first motor means attached to each of said yoke means and coupled in driving relation with said lighting instruments for rotating said instruments in a vertical plane;
   (c) second motor means coupled in driving relation to each of said yoke means for rotating said lighting instruments in a horizontal plane;
   (d) at least one satellite module means including a microprocessor having a serial data input port, a serial data output port and an input/output port;
   (e) motor control means responsive to digital signals and coupled to said input/output port of said microprocessor means in said satellite module and to said first and second motor means for driving said first and second motor means in accordance with digital information received over said serial data input port;
   (f) shaft encoder means driven by said first and second motor means for developing a digital pulse count indicative of the distance the shafts of said first and second motor means have moved from a given starting position;
   (g) controller module means including microprocessor means and memory means for storing a program of instructions and lamp positioning preset data at addressable locations therein, said preset data comprising numerical counts indicative of position within the field of movement of said lighting instrument, said microprocessor means in said controller module having a serial data input port, a serial data output port and an input/output port;
   (h) means coupling said serial data input port of said microprocessor means in said controller module to said serial data output port of said microprocessor means in said satellite module and said serial data input port of said microprocessor means in said satellite module to said serial data output port of said microprocessor means in said controller module; and
   (i) keyboard means coupled to said input/output port of said microprocessor means in said controller module for first entering data into said microprocessor means in said controller module by moving said lighting instruments to desired orientations and subsequently entering said lighting instruments positioning data corresponding to said desired orientations into said memory means in said controller module as a preset data block when said system is operating in a "design" mode and for selecting presets from said preset data blocks stored in said memory means representing desired positions for said plurality of lighting instruments when said system is operating in a "run" mode.

2. The system as in claim 1 wherein said microprocessor means in said controller module is programmed to compute a pulse count and directional signal corresponding to the positional difference between a current lighting instrument location and a selected preset position, said pulse count and direction signal being transmitted as a serial digital quantity to said satellite module for controlling said first and second motor means.

3. The system as in claim 1 wherein a plurality of said satellite module means are coupled to said serial data input port and said serial data output port of said controller module means by multiplexing means.

4. The system as in claim 1 wherein said keybord means includes a plurality of mode control switches, a selection of a first of said plurality of mode control switches allowing lighting instrument presets to be created and subsequently stored in said preset data block in said memory means when said system is operating in said "design" mode and operation of a second of said plurality of mode control switches allowing said lamps to be moved from a current position to another preset position when said system is operating in said "Run" mode.

5. The system for controlling the positioning of a plurality of lighting instruments comprising:
(a) a plurality of lighting instruments, each including a lamp contained within a canister;
(b) means for individually mounting said canisters for limited rotational movement about mutually perpendicular axes so that the lighting instruments can tilt in a vertical plane and pan in a horizontal plane;
(c) first and second lighting instrument drive motors coupled to said means for mounting for selectively causing said limited rotational movement of said lighting instruments;
(d) a plurality of satellite modules, each including microprocessor means coupled in controlling relation to a plurality of said lighting instrument drive motors;
(e) means for monitoring the rotational movement of said lighting instruments and providing a digital count value to the microprocessor means in the satellite module associated with said lighting instruments;
(f) a controller module including microprocessor means and memory means for storing a program of instructions, desired positioning data and current actual positioning data for each of said lighting instruments at addressable locations therein; and
(g) means coupling said controller module to each of said satellite modules for bi-directional, serial data communication therebetween, said controller module providing lighting instrument movement commands to said satellite modules and said satellite modules providing lighting instrument positional data to said controller module upon execution of said instrument movement commands.

6. The system as in claim 5 and further including keyboard data entry means coupled to said microprocessor means in said controller module for selecting predetermined sequences from said program of instructions whereby said controller module provides differing modes of operation to said plurality of lighting instruments.

7. The system as in claim 5 wherein said means coupling said controller module to each of said satellite modules comprises a first serial data line connected between an output port of said microprocessor means in said controller module to an input port of said microprocessor means in said satellite modules and a second serial data line coupled between an outport of said microprocessor means in said satellite modules to an input port of said microprocessor means in said controller module.

8. The system as in claim 5 wherein said means for monitoring the rotational movement of said lighting instruments comprises shaft encoder wheels coupled to the shafts of said first and second lighting instrument drive motors for each lighting instrument associated with a given satellite module and means coupling said shaft encoder means to an input port of said microprocessor means in said given satellite module, whereby said microprocessor means in said given satellite module develops count value corresponding to the displacements of said lighting instruments from a predetermined "home" positions for each.

* * * * *